July 31, 1928. 1,678,942
M. K. HOLMES
MECHANICAL MOVEMENT
Original Filed Dec. 1, 1924
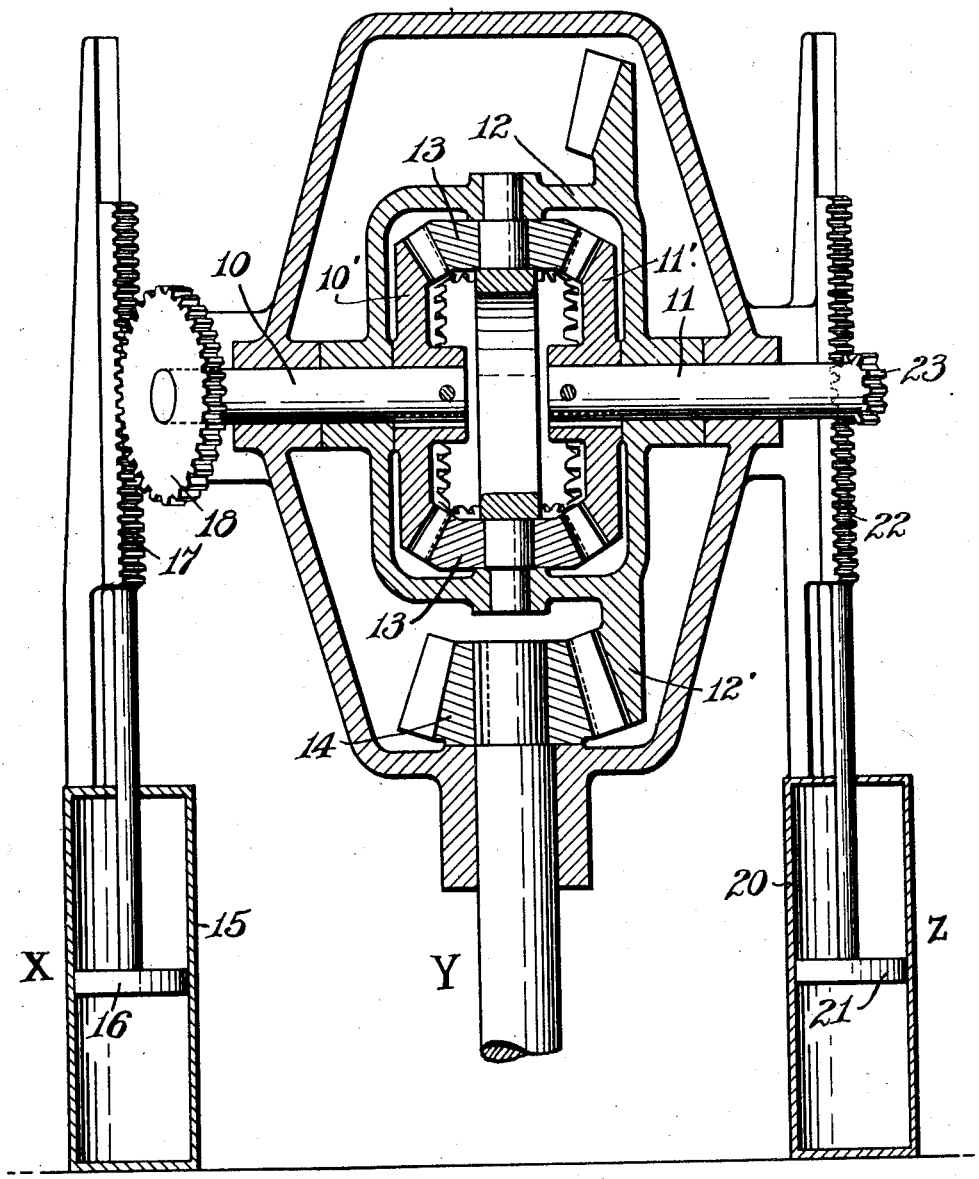
INVENTOR
Minot K. Holmes,
BY
Hood + Hahn
ATTORNEYS Patented July 31, 1928.

1,678,942

UNITED STATES PATENT OFFICE.

MINOT K. HOLMES, OF MUNCIE, INDIANA, ASSIGNOR TO HEMINGRAY GLASS COMPANY, OF MUNCIE, INDIANA, A CORPORATION OF KENTUCKY.

MECHANICAL MOVEMENT.

Original application filed December 1, 1924, Serial No. 753,220. Divided and this application filed May 26, 1926. Serial No. 111,689.

The object of my invention is to produce a new mechanical movement having a variety of capabilities.

The accompanying drawing illustrates the invention diagrammatically.

In the diagram 10 and 11 indicate the two alined shafts of a differential gearing such, for instance, as is incorporated in the driving axle structure of an automobile and comprising a primary rotary element 12 so gear-connected to the two shafts 10 and 11 that they may rotate either in unison or at variance with one another. In the diagram the connection between shafts 10 and 11 and element 12 is formed by the two bevel gears 10' and 11', secured respectively to shafts 10 and 11, and a series of planetary pinions 13 journalled on the element 12.

Geared to element 12 is a power shaft Y which, in the present instance, is connected to element 12 by a pinion 14 on the shaft and a gear 12' on the element 12.

Geared to shaft 10 is a power unit X which, in the present instance comprises a pressure cylinder 15 in which is mounted a piston 16 connected by a rack 17 and gear 18 to shaft 10.

Geared to shaft 11 is a power unit Z which, in the present instance, comprises a pressure cylinder 20 in which is mounted a piston 21 connected by a rack 22 and gear 23 to shaft 11.

The power units X and Z may be connected in any desired manner and by any desired means to the two shafts, the primary essential being that the units, or the connections, shall be such that the power effects of the two units on the center element of the differential shall be different. In the present instance this difference is obtained by using cylinders of equal sizes and gears 18 and 23 of different sizes.

For purposes of generalization shaft Y may be called the intermediate power unit, and the units X and Z may be called the end power units of different values, the arrangement being such that the intermediate power unit is balanced against the end power units, (or vice versa) through the differential. The end units X and Z may be considered the power applying units and the intermediate unit Y the power delivery unit, or vice versa.

Typical instances of utilization of my device are as follows:

(1) Consider unit Y as the power delivery element and units X and Z as power applying elements.

Suppose unit Y to be needed for action against a rotative element which gives an initially high resistance to movement but which, when once started should be moved rapidly. Power applied simultaneously to the two units X and Z will act as follows:

Unit X having a low-speed connection to the differential, will act with greater power but with less speed, upon element Y and will thus start it against the initially high resistance, but as soon as this high resistance is overcome, unit Z, at its higher speed, will become effective upon unit Y through the differential and said unit Y will be advanced at a higher speed than would be possible if only unit X were present and this will be true in spite of the fact that unit Z, acting alone, would have been ineffective to start unit Y into movement and therefore, if alone, would have been unable to move unit Y at all.

(2) Consider unit Y as the power applying element and units X and Z as power delivery elements.

Suppose now that power be applied to unit Y. Unit X, being capable of offering a greater resistance than unit Z through the differential, unit Z will yield first until its resistance has been increased—as by a limiting stop—and unit X will remain stationary. As soon, however, as the resistance of unit Z has become sufficient, unit X will begin to yield. Immediately upon a reversal of force applied to unit Y, however, unit Z will again be the first to yield. The sequence of movement, during reversals of movement, of unit Y, would be: Y± produces Z+, X+, Z—, X—.

By reversing the one rack, say 22, relative to its pinion 23, it is apparent that the sequence might be:

Y±, produces Z=, X+, Z+, X—.

Many other possibilities will readily suggest themselves.

The phrase "balanced against" is used in the sense of being capable of offering resistance to.

This application is a division of my application Serial No. 753,220, filed December 1st, 1924.

I claim as my invention:

A mechanical movement comprising a differential gearing, a power delivery shaft geared to the middle of said differential, and two power applying units having a rack and gear connection respectively with the ends of said differential at effectively different power values.

In witness whereof, I have hereunto set my hand at Muncie, Indiana, this 22 day of May, A. D. one thousand nine hundred and twenty-six.

MINOT K. HOLMES.